(12) United States Patent
Fisher et al.

(10) Patent No.: US 7,961,219 B2
(45) Date of Patent: *Jun. 14, 2011

(54) SYSTEM AND METHOD FOR EFFECTIVELY IMPLEMENTING AN ELECTRONIC IMAGE HUB DEVICE

(75) Inventors: Clay H. Fisher, Belmont, CA (US); Steven G. Goldstein, Los Angeles, CA (US); David G. Longendyke, Vernon, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/316,427

(22) Filed: Dec. 12, 2008

(65) Prior Publication Data

US 2009/0102930 A1    Apr. 23, 2009

(51) Int. Cl.
*H04N 5/225* (2006.01)
*H04N 5/232* (2006.01)
(52) U.S. Cl. .................. 348/207.1; 348/211.2; 348/372
(58) Field of Classification Search ............... 348/207.1, 348/211.99, 211.1, 211.2, 211.3; 358/1.15
See application file for complete search history.

(56) References Cited

U.S. PATENT DOCUMENTS

| 5,477,264 | A | * | 12/1995 | Sarbadhikari et al. | 348/231.6 |
|---|---|---|---|---|---|
| 5,949,551 | A | * | 9/1999 | Miller et al. | 358/408 |
| 6,006,039 | A | * | 12/1999 | Steinberg et al. | 396/57 |
| 6,177,957 | B1 | * | 1/2001 | Anderson | 348/231.99 |
| 6,370,376 | B1 | * | 4/2002 | Sheath | 455/556.1 |
| 6,522,352 | B1 | * | 2/2003 | Strandwitz et al. | 348/211.2 |
| 6,526,516 | B1 | * | 2/2003 | Ishikawa et al. | 713/340 |
| 6,580,460 | B1 | * | 6/2003 | Takahashi et al. | 348/372 |
| 6,628,325 | B1 | * | 9/2003 | Steinberg et al. | 348/211.1 |
| 6,750,902 | B1 | * | 6/2004 | Steinberg et al. | 348/211.3 |
| 6,784,924 | B2 | * | 8/2004 | Ward et al. | 348/207.1 |
| 2004/0208476 | A1 | * | 10/2004 | Manowitz et al. | 386/46 |

* cited by examiner

*Primary Examiner* — Kelly L Jerabek
(74) *Attorney, Agent, or Firm* — Gregory J. Koerner; Redwood Patent Law (57) ABSTRACT

A system and method for effectively implementing an electronic image hub device includes a peripheral device, such as a digital camera, that may be periodically connected to the image hub device by a system user. The system user may then utilize the image hub device to transfer captured data from the peripheral device to a specific data destination, such as a user service on a distributed computer network. The peripheral device also may utilize the image hub device to recharge batteries that become depleted through operation of the peripheral device. The system user may then subsequently access and utilize the captured data from the data destination in accordance with the present invention.

1 Claim, 8 Drawing Sheets

SYSTEM AND METHOD FOR EFFECTIVELY IMPLEMENTING AN ELECTRONIC IMAGE HUB DEVICE

CROSS-REFERENCE TO RELATED APPLICATIONS

This application relates to, and claims priority in, U.S. Provisional Patent Application Ser. No. 60/187,137, entitled "Imagehub" that was filed on Mar. 6, 2000, and also relates to, and claims priority in, U.S. patent application Ser. No. 09/780,839, entitled "System And Method For Effectively Implementing An Electronic Image Hub Device" that was filed on Feb. 8, 2001. The foregoing related Applications are commonly assigned, and are hereby incorporated by reference.

BACKGROUND SECTION

1. Field of the Invention

This invention relates generally to techniques for managing visual information, and relates more particularly to a system and method for effectively implementing an electronic image hub device.

2. Description of the Background Art

Implementing effective methods for managing visual information is a significant consideration for designers and manufacturers of contemporary electronic devices. However, effectively managing visual information with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively stores, displays, and manipulates digital image data may benefit from an efficient implementation because of the large amount and complexity of the digital data involved.

Due to growing demands on system resources and substantially increasing data magnitudes, it is apparent that developing new techniques for managing visual information is a matter of concern for related electronic technologies. Therefore, for all the foregoing reasons, developing effective systems for managing visual information remains a significant consideration for designers, manufacturers, and users of contemporary electronic devices.

SUMMARY

In accordance with the present invention, a system and method are disclosed for effectively implementing an electronic image hub device. In one embodiment, initially, a system user may preferably connect a camera device (or other peripheral device) to an image hub using any effective and appropriate means. The camera device may be implemented in any effective manner, however, in many embodiments, a basic and cost-effective camera device may be economically utilized.

Next, a download manager in the image hub may preferably detect a request to download content information from the docked camera device. When the download manager detects a download request, then the download manager may preferably transfer the particular content information (including captured image data) from the camera device to the image hub.

The image hub may then preferably determine one or more appropriate image management functions to perform with regard to the downloaded content information. For example, the image hub may perform various data manipulation and/or analysis functions on the downloaded content information. In many embodiments, the image hub may preferably route or upload the content information to an appropriate or designated data destination by utilizing an upload manager. In accordance with the present invention, the upload manager may route the content information using any effective technique.

In one embodiment, the image hub may preferably recognize and route the content information from a given camera device based upon a camera identification parameter that may be programmed into that camera and detected by the image hub. Alternately, a given camera device may mark image data with an image identifier tag that may recognized and utilized by either the image hub or the data destination to subsequently provide that image data to the correct system user. In addition, the image hub may route content information to one or more data destinations based upon a hub identifier value, or by referencing destination information entered into the image hub by the system user or system operator.

In accordance with the present invention, in certain embodiments, a recharge manager may detect that a non-removable battery from the camera device is currently in a depleted condition, and responsively utilize a recharger module from the image hub to recharge the depleted battery. In other embodiments, the recharger module may automatically recharge the battery whenever the camera device is connected to the image hub.

If valid conditions exist for a successful completion of the foregoing image management functions, then application software from the image hub may preferably execute the selected image management functions (such as routing the content information to a data destination). Finally, a system user may then advantageously access, manipulate, and utilize the content information from the data destination, in accordance with the present invention. The present invention thus provides an improved system and method for effectively implementing an electronic image hub device.

DETAILED DESCRIPTION

The present invention relates to an improvement in visual information management techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively implementing an electronic image hub device, and preferably includes a peripheral device, such as a digital camera, that may be periodically connected to the image hub device by a system user. The system user may then utilize the image hub device to transfer captured data from the peripheral device to a specific data destination, such as a user service on a distributed computer network like the Internet. The peripheral device may also utilize the image hub device to recharge batteries that become depleted through operation of the peripheral device. The system user may then subsequently access and utilize the captured data from the data destination in accordance with the present invention.

Figure 1:
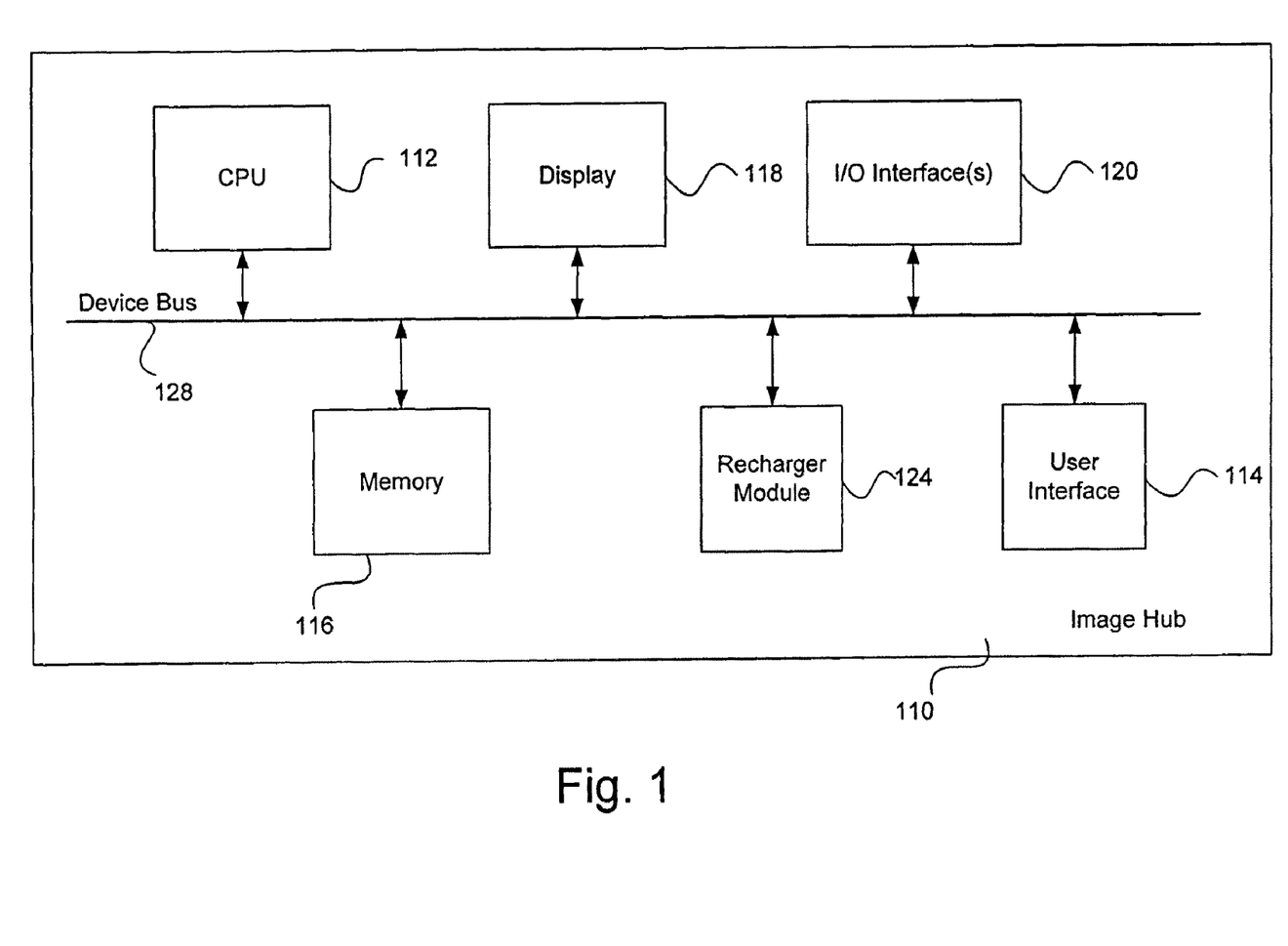
FIG. 1 is a block diagram for one embodiment of an electronic image hub device, in accordance with the present invention.

Referring now to FIG. 1, a block diagram for one embodiment of an image hub device 110 is shown, in accordance with the present invention. In the FIG. 1 embodiment, image hub 110 preferably includes, but is not limited to, a central processing unit (CPU) 112, a user interface 114, memory 116, a display 118, input/output interface(s) (I/O interface(s)) 120, and a recharger module 124. The foregoing components of image hub 110 may preferably be coupled to, and communicate through, a device bus 128. In alternate embodiments, image hub 110 may readily be implemented using various components and configurations in addition to, or instead of, those discussed in conjunction with the FIG. 1 embodiment.

In the FIG. 1 embodiment, a system user may advantageously download various types of information from a portable peripheral device, such as a digital camera, to image hub 110. Image hub 110 may then responsively upload the received information to a selectable data destination, such as an Internet image service, using any effective means, to thereby provide an efficient transfer of information for subsequent access and utilization by the system user.

In the FIG. 1 embodiment, CPU 112 may be implemented to include any appropriate and compatible microprocessor device that preferably executes software instructions to thereby control and manage the operation of image hub 110. The FIG. 1 display 118 preferably may include any effective type of display technology including a cathode-ray-tube monitor or a liquid-crystal display device. In certain embodiments, display 118 may be attached to an exterior surface of image hub 110 with a hinge mechanism to permit display 118 to be folded against image hub 110 when not in use, or during transport.

In the FIG. 1 embodiment, I/O interface(s) 120 preferably may include one or more input and/or output interfaces to receive and/or transmit any required types of relevant information by image hub 110. I/O interface(s) 120 are further discussed below in conjunction with FIG. 5. In the FIG. 1 embodiment, memory 116 may be implemented to include any combination of desired storage devices, including, but not limited to, read-only memory (ROM), random-access memory (RAM), and various types of non-volatile memory, such as floppy disks or hard disks. The contents and functionality of memory 116 are further discussed below in conjunction with FIGS. 2-3.

Recharger module 124 preferably may include appropriate means to support recharging batteries of various peripheral electronic devices that are connected to image hub 110. For example, in certain embodiments, recharger module 124 may include, but is not limited to, a battery charging circuit and a connector interface for coupling recharger module 124 to one or more electronic camera devices to recharge battery units in the camera device.

In the FIG. 1 embodiment, user interface 114 preferably may include any effective means to allow a system user to communicate with image hub 110. For example, user interface 114 may support a keyboard device, a wireless remote control device, a speech-recognition module with corresponding microphone, a graphical user interface with touch-screen capability, or a selection button array mounted externally on image hub 110.

User interface 114 may also include various types of lights or other indicia mounted to an external surface of image hub 110 to indicate the status of one or more electronic cameras that are currently docked with image hub 110 for transferring image data. For example, image hub 110 may include a docked indicator to show that a given camera is connected to image hub 110, a charged indicator to indicate that batteries of a given docked camera are completed recharged, and/or an empty indicator to shown that all image data has been transferred from a given docked camera to image hub 110.

The FIG. 1 discloses an embodiment of image hub 110 that includes relatively powerful performance capabilities and operating characteristics. However, in various alternate embodiments, a simplified embodiment of image hub 110 is equally contemplated by the present invention. For example, image hub 110 may be implemented as a basic interface device for passively receiving and transferring image data from one or more camera devices to a networked destination without performing significant processing, storage, or manipulation of the transferred image data. The functionality and operation of image hub 110 is further discussed below in conjunction with FIGS. 2 through 8.

Figure 2:
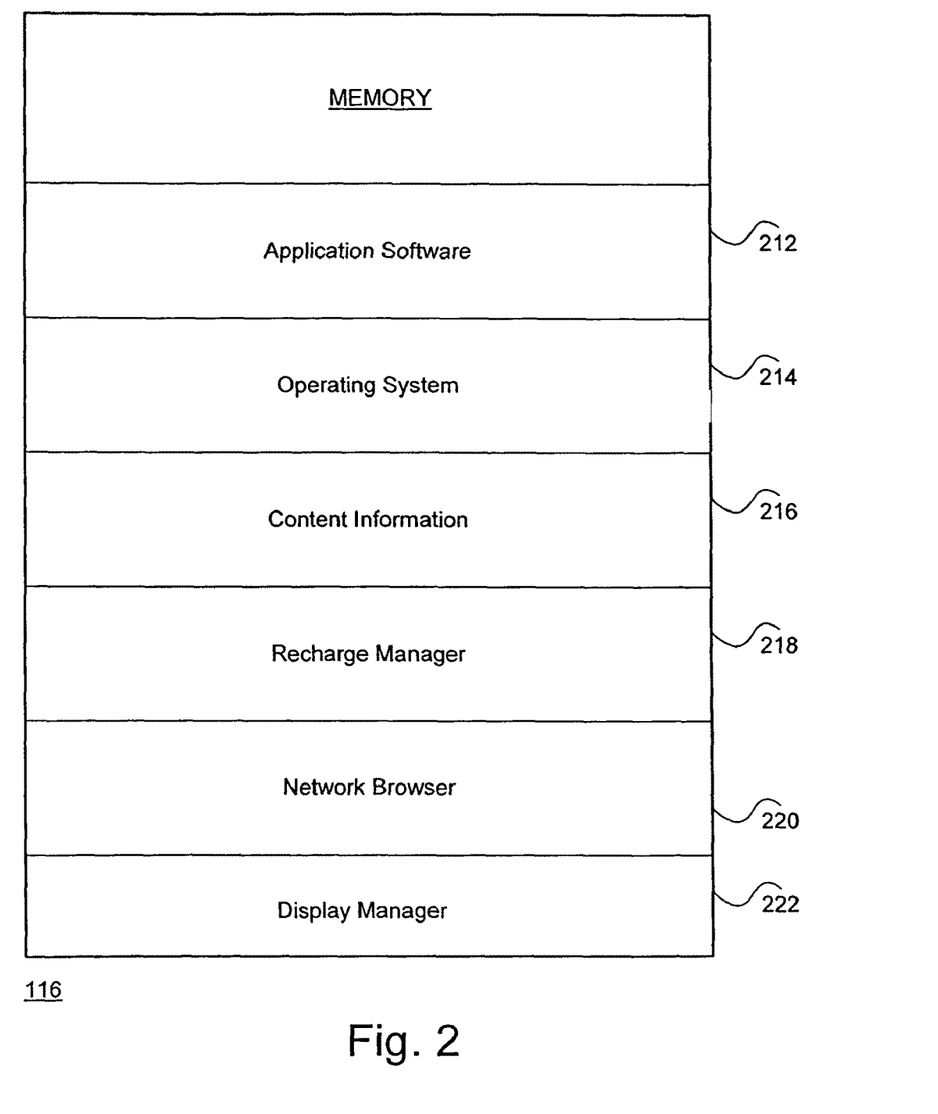
FIG. 2 is a block diagram for one embodiment of the memory of FIG. 1, in accordance with the present invention.

Referring now to FIG. 2, a block diagram for one embodiment of the FIG. 1 memory 116 is shown, in accordance with the present invention. In the FIG. 1 embodiment, memory 116 may preferably include, but is not limited to, application software 212, an operating system 214, content information 216, a recharge manager 218, a network browser 220, and a display manager 222. In alternate embodiments, memory 116 may readily include various other components in addition to, or instead of, those components discussed in conjunction with the FIG. 2 embodiment.

In the FIG. 2 embodiment, application software 212 may include program instructions that are preferably executed by CPU 112 (FIG. 1) to perform various functions and operations for image hub 110. The particular nature and functionality of application software 212 preferably varies depending upon factors such as the type and particular use of the corresponding image hub 110. The configuration and functionality of application software 212 is further discussed below in conjunction with FIG. 3.

In the FIG. 2 embodiment, operating system 214 preferably controls and coordinates low-level functionality of image hub 110. Content information 216 preferably may include various types of captured image data or other types of information that may be downloaded from one or more peripheral devices, such as a digital camera device. Content information 216 may be temporarily stored in image hub 110 before being uploaded to a data destination, such as a network image service on a distributed computer network like the Internet. The structure and configuration of content information 216 is further discussed below in conjunction with FIG. 4. Recharge manager 218 preferably includes software instructions to control various peripheral-device battery-charging functions that image hub 110 may perform when a peripheral device, such as a digital camera, is docked with image hub 110.

In the FIG. 2 embodiment, network browser 220 preferably may control bi-directional communications between image hub 110 and a distributed computing network. For example, network browser 220 may include an Internet browser module to allow image hub 110 to download or upload information to or from the Internet. In certain embodiments, image hub 110 may function as an image source for providing content information 216 to a location or service of the Internet. Display manager 222 preferably coordinates and controls the presentation of appropriate visual information on display 118 in response to instructions from application software 212. In certain embodiments, display manager 222 and associated hardware components support a high-resolution display output for presentation of content information 216.

Figure 3:
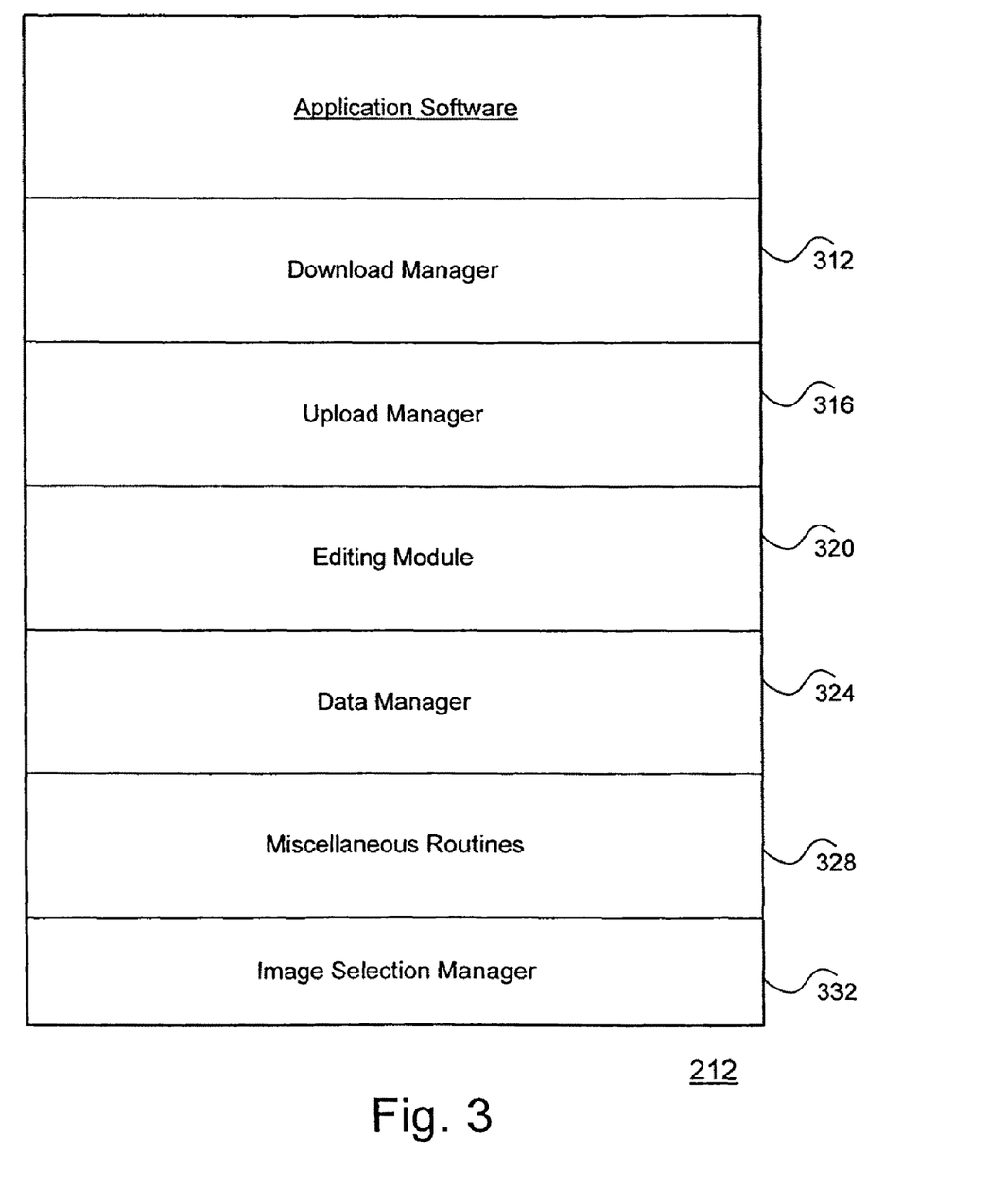
FIG. 3 is a block diagram for one embodiment of the application software of FIG. 2, in accordance with the present invention.

Referring now to FIG. 3, a block diagram for one embodiment of the FIG. 2 application software 212 is shown, in accordance with the present invention. In the FIG. 3 embodiment, application software 212 preferably may include, but is not limited to, a download manager 312, an upload manager 316, an editing module 320, a data manager 324, miscellaneous routines 328, and an image selection manager 332. In alternate embodiments, application software 212 may readily include various other components in addition to, or instead of, those components discussed in conjunction with the FIG. 3 embodiment.

In the FIG. 3 embodiment, download manager 312 may preferably coordinate the downloading and storing of various types of content information 216 from any appropriate source. For example, a camera device may capture and store various types of content information (including image data) into a temporary buffer memory in the camera device. When a system user docks the camera device to image hub 110, download manager 312 may then preferably access the content information from the camera device, and temporarily store the content information 216 in memory 116.

In the FIG. 3 embodiment, upload manager 316 preferably may control the uploading of content information 216 to various appropriate data destinations. For example, upload manager 316 may provide content information 216 to a host computer system or to a networked destination such as the Internet. Editing module 320 may preferably control various editing procedures for editing content information 216. For example, editing module 320 may be utilized to insert various templates or overlays into individual images stored as content information 216.

In the FIG. 3 embodiment, data manager 324 may preferably manage content information 216 that is temporarily stored in image hub 110. For example, data manager 324 may create and restructure content information 216 into various directories and folders to effectively organize various images in content information 216. Miscellaneous routines 328 may include any desired software instructions to facilitate functions performed by image hub 110. For example, miscellaneous routines 328 may include a data transformation routine that translates a downloaded format of content information 216 into an uploadable format of the same content information 216 that is compatible with a selected data destination.

In the FIG. 3 embodiment, a system user may utilize image selection manager 332 to view, select, and order desired images that were transferred as content information 216 from their camera device to either image hub 110, or through image hub 110 to a data destination on the Internet or other distributed computer network.

Figure 4:
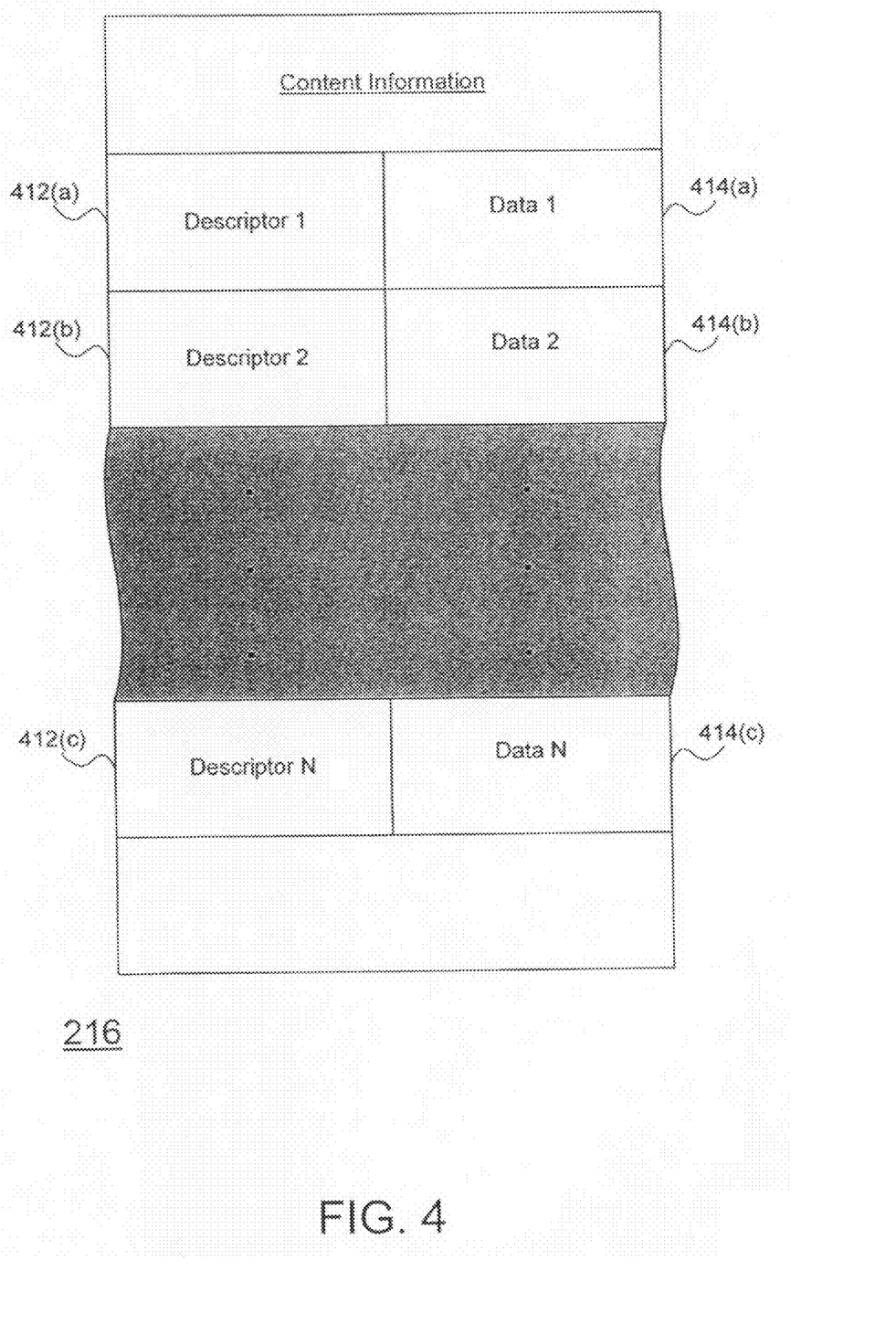
FIG. 4 is a block diagram for one embodiment of the content information of FIG. 2, in accordance with the present invention.

Referring now to FIG. 4, a block diagram for one embodiment of the FIG. 2 content information 216 is shown, in accordance with the present invention. In alternate embodiments of the present invention, content information 216 may readily be implemented to include various other configurations, and may also include various items and components that are different from those discussed in conjunction with the FIG. 4 embodiment.

In the FIG. 4 embodiment, content information 216 preferably may include individual sets of data 1 (414(a)) through data N (414(c)) that each preferably corresponds with a specific captured image or other type of stored information. In the FIG. 4 embodiment, content information 216 preferably also may include a descriptor 1 (412(a)) through a descriptor N (412(c)) that each is preferably associated with a different respective peripheral device or system user that is utilizing image hub 110. In alternate embodiments, content information 216 may be configured to include one or more single descriptors 412 that describe multiple sets of data 414. In addition, in certain embodiments, content information 216 may be implemented without utilizing descriptor(s) 412.

Figure 5:
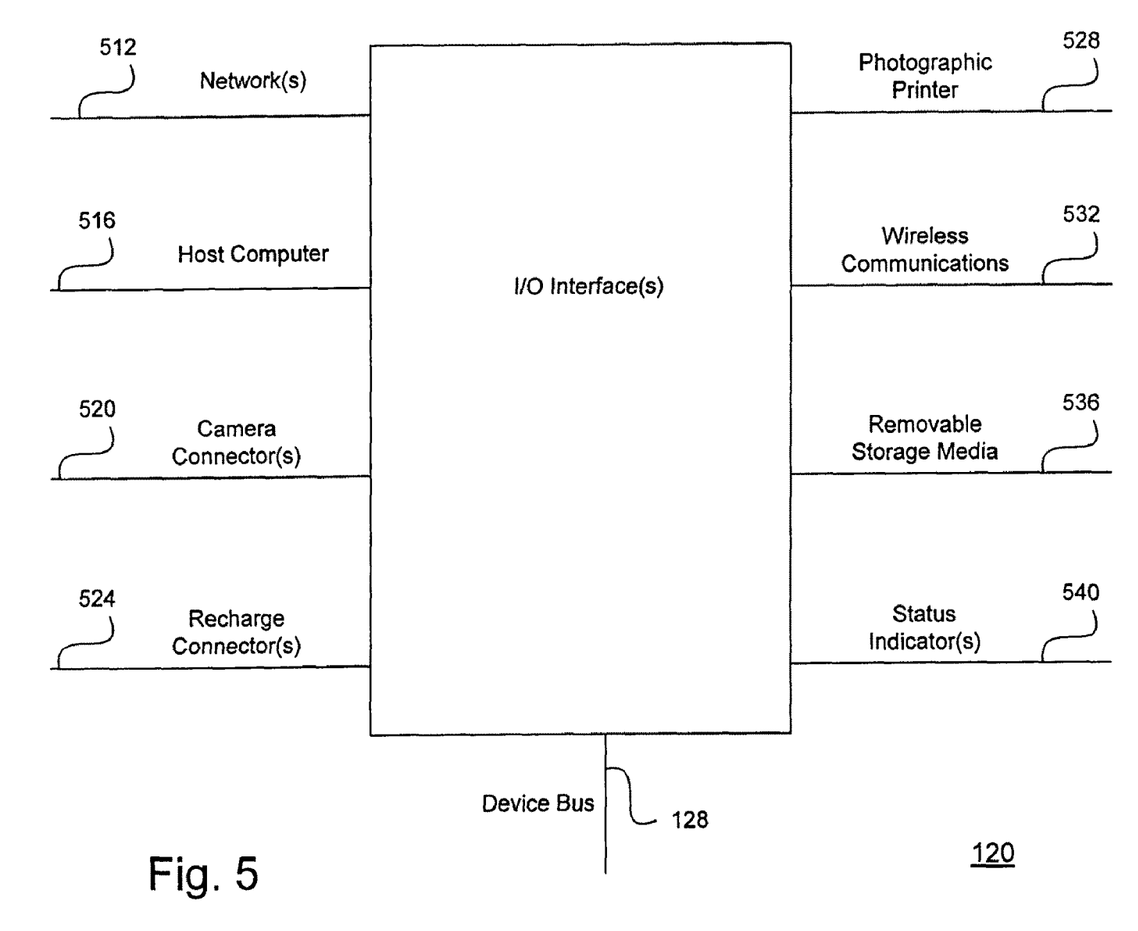
FIG. 5 is a block diagram for one embodiment of the I/O interface(s) of FIG. 1, in accordance with the present invention.

Referring now to FIG. 5, a block diagram for one embodiment of the FIG. 1 I/O interface(s) 120 is shown, in accordance with the present invention. In the FIG. 5 embodiment, I/O interface(s) 120 preferably may communicate with various input or output entities that may include, but are not limited to, network(s) 512, a host computer 516, one or more camera connector(s) 520, a photographic printer 528, wireless communications 532, removable storage media 536, one or more recharge connector(s) 524, and one or more status indicator(s) 540. I/O interface(s) 120 may preferably communicate with image hub 110 via device bus 128. In alternate embodiments, I/O interface(s) 120 may readily include various other elements and functionalities in addition to, or instead of, those discussed in conjunction with the FIG. 5 embodiment. In addition, I/O interface(s) 120 may be implemented and configured using any effective technology or method.

In the FIG. 5 embodiment, image hub 110 may utilize I/O interface(s) 120 to bi-directionally communicate with one or more network(s) 512. For example, image hub 110 may advantageously communicate with the Internet or other distributed computer networks to upload or download various types of content information 216.

Image hub 110 may also utilize I/O interface(s) 120 to bi-directionally communicate with a host computer 516. For example, image hub 110 may communicate with a personal computer device over a Universal Serial Bus (USB) to effectively upload or download various types of content information 216. The foregoing personal computer device may then be utilized to process, transfer, manipulate, and otherwise utilize the content information 216 from image hub 110. In the FIG. 5 embodiment, image hub 110 may utilize I/O interface(s) 120 to bi-directionally communicate with one or more camera connector(s) 520 that preferably each dock or couple a given digital camera (or other peripheral device) to image hub 110 for downloading data and recharging camera batteries.

In the FIG. 5 embodiment, image hub 110 may also utilize I/O interface(s) 120 to bi-directionally communicate with various types of wireless communications 532. Wireless communications 532 preferably may include any effective means to remotely communicate with an external entity such as an Internet server, to thereby exchange relevant information for successful operation of image hub 110. In addition, image hub 110 may utilize wireless communications 532 to download various types of content information 216 and other data from a wireless source such as a digital camera device or a computer. In certain embodiments, wireless communications 532 may also receive various control information from a wireless remote control device. Wireless communications 532 may be implemented using any appropriate wireless technology, including radio-frequency transmission, infrared transmission, or micro-wave transmission.

In the FIG. 5 embodiment, removable storage media 536 may preferably be utilized to receive or provide any desired information for facilitating the operation of image hub 110. For example, removable storage media 536 may provide means for bi-directional transfers of content information 216 between image hub 110 and other appropriate entities, such as a digital camera device or a host computer. In certain embodiments, removable storage media 536 may include memory devices to support any desired type or combination of removable storage media. For example, removable storage media 536 may include memory sticks, flash memory devices, compact disks, mini-disks, or floppy disks.

In the FIG. 5 embodiment, image hub 110 may utilize I/O interface(s) 120 to bi-directionally communicate with one or more recharge connector(s) 524 that preferably each dock or couple a given digital camera (or other peripheral device) to image hub 110 for recharging one or more batteries in the docked peripheral device. In certain embodiments, recharge connector(s) 524 may be implemented as part of camera connector(s) 520.

In the FIG. 5 embodiment, status indicator(s) 540 may include various types of lights or other indicia mounted to an external surface of image hub 110, or presented on a graphical user interface on display 118 (FIG. 1) to indicate the status of various parameters for one or more peripheral devices that are currently docked with image hub 110. For example, status indicator(s) 540 may include a docked indicator to show that a given camera is connected to image hub 110, a charged indicator to indicate that batteries of a given docked camera are completed recharged, and/or an empty indicator to shown that all image data has been transferred from a given docked camera to image hub 110.

In addition to the various foregoing enumerated types of I/O interface(s) 120, image hub 110 may preferably also include any required types of interfaces or connectors (not shown) for coupling image hub 110 with other hardware devices to support any bi-directional electronic communications.

Figure 6:
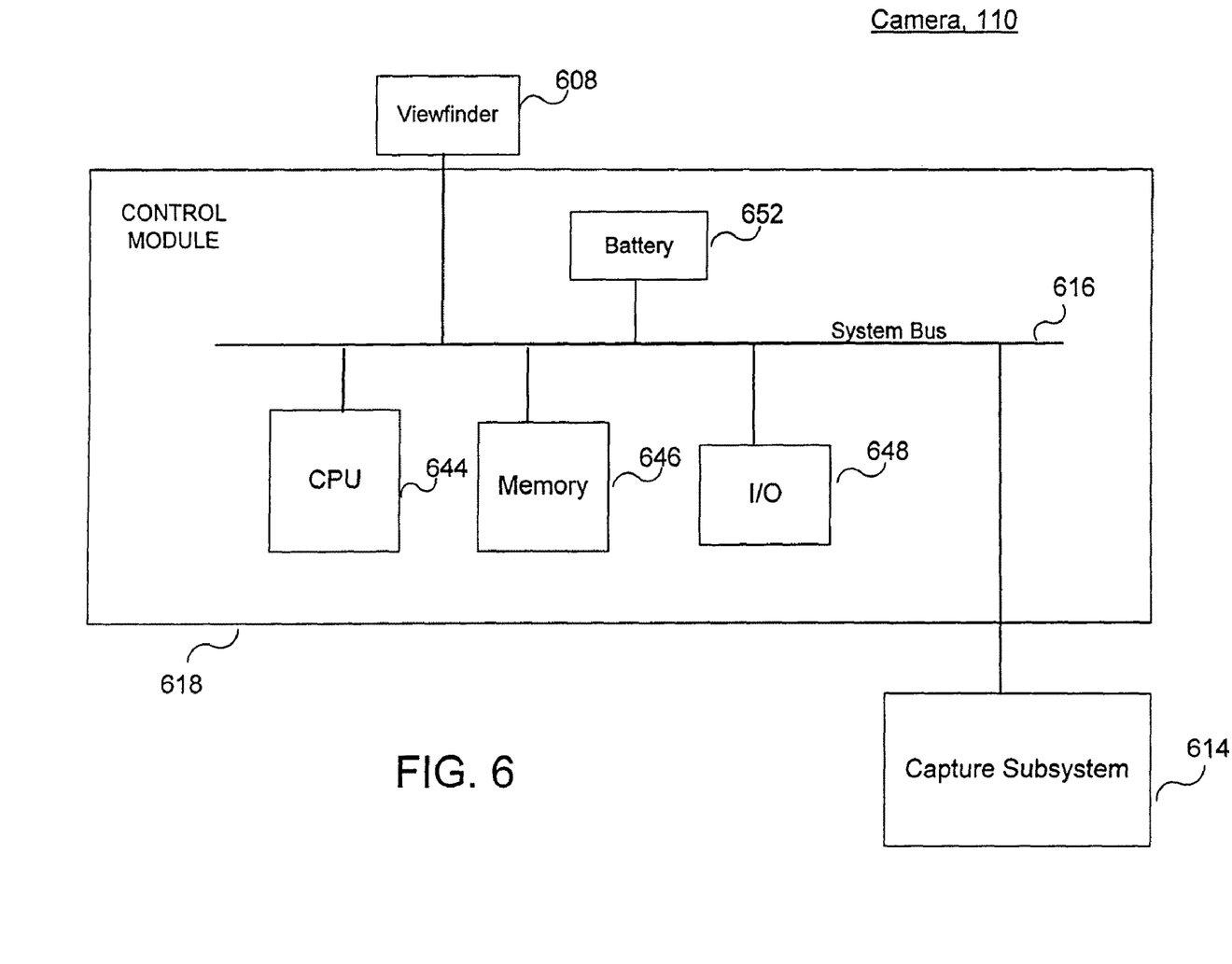
FIG. 6 is a block diagram for one embodiment of an electronic camera device, in accordance with the present invention.

Referring now to FIG. 6, a block diagram for one embodiment of a camera device 610 is shown, in accordance with the present invention. In the FIG. 6 embodiment, camera 610 may include, but is not limited to, a capture subsystem 614, a camera system bus 616, and a control module 618. In the FIG. 6 embodiment, capture subsystem 614 may be optically coupled to a target object (not shown), and may also be electrically coupled via camera system bus 616 to control module 618.

In alternate embodiments, camera device 610 may readily include various other components in addition to, or instead of, those components discussed in conjunction with the FIG. 6 embodiment. In addition, in certain embodiments, the present invention may alternately be embodied as any appropriate type of electronic device other than the camera device 610 of FIG. 6. For example, camera device 610 may readily be implemented as another type of portable electronic device, such as a scanner device or a hand-held personal digital assistant device.

In the FIG. 6 embodiment, once a system user has focused capture subsystem 614 on a target object and requested camera device 610 to capture image data corresponding to the target object, then control module 618 may preferably instruct capture subsystem 614 via camera system bus 616 to capture image data representing the target object. The captured image data may then be transferred over camera system bus 616 to control module 618, which may responsively perform various processes and functions with the image data. Camera system bus 616 may also bi-directionally pass various status and control signals between capture subsystem 614 and control module 618.

In the FIG. 6 embodiment, control module 618 preferably includes, but is not limited to, a viewfinder 608, a central processing unit (CPU) 644, a memory 646, one or more input/output interface(s) (I/O) 648, and battery 652. Viewfinder 608, CPU 644, memory 646, I/O 648, and battery 652 preferably are each coupled to, and communicate, via common camera system bus 616 that also communicates with capture subsystem 614. In alternate embodiments, control module 618 may readily include various other components in addition to, or instead of, those components discussed in conjunction with the FIG. 6 embodiment.

In the FIG. 6 embodiment, CPU 644 may preferably be implemented to include any appropriate microprocessor device. Memory 646 may preferably be implemented as one or more appropriate storage devices, including, but not limited to, read-only memory, random-access memory, and various types of non-volatile memory. In accordance with the present invention, because camera 610 may advantageously download the captured image data to image hub 110 for subsequent routing and other data management functions, memory 646 may therefore be economically implemented using a limited memory size to store only a minimal amount of captured image date and other information. In many embodiments, camera device 610 is preferably not implemented to include any removable memory devices, and memory 646 is preferably implemented as a temporary buffer memory of limited size that may only be accessed and downloaded by image hub 110.

I/O 648 preferably may be dedicated to providing one or more effective interfaces for facilitating bi-directional communications between camera device 610 and image hub 110. I/O 648 may be implemented using any appropriate input and/or output mechanism. Battery 652 preferably may include any type of rechargeable battery unit (or units) for providing operating power to camera device 610. In accordance with certain embodiments of the present invention, battery 652 may preferably be implemented as a non-removable device that may only be recharged by the corresponding recharger module 124 of image hub 110.

In practice, camera device 610 is exclusively dedicated to image hub 110 because all image data that is captured by camera device 610 may only be accessed and utilized by a system user through image hub 110. Furthermore, battery 652 of camera device 610 may only be recharged by utilizing recharger module 124 of image hub 110. The operation and utilization of camera 610 is further discussed below in conjunction with FIGS. 7 and 8.

Figure 7:
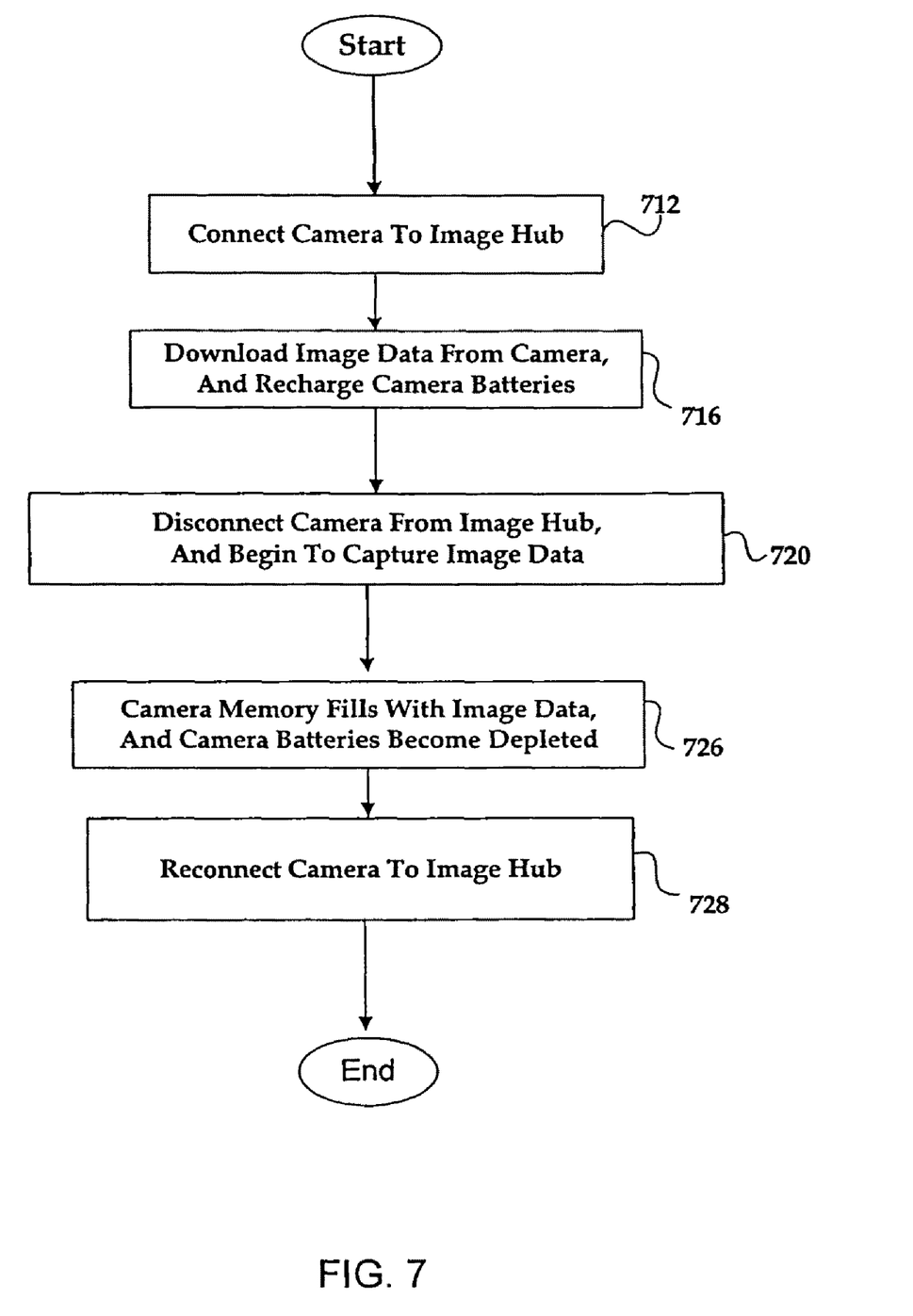
FIG. 7 is a flowchart of method steps for utilizing a camera device, in accordance with one embodiment of the present invention.

Referring now to FIG. 7, a flowchart of method steps for utilizing a camera device 610 is shown, in accordance with one embodiment of the present invention. The FIG. 7 embodiment is presented for purposes of illustration, and, in alternate embodiments, the present invention may readily utilize various other steps and sequences than those discussed in conjunction with the FIG. 7 embodiment.

In the FIG. 7 embodiment, in step 712, a system user may preferably connect a camera device 610 (or other peripheral device) to image hub 110 using any effective and appropriate means. As discussed above in conjunction with FIG. 6, camera device 610 may be implemented in any effective manner. However, in accordance with the present invention, in many embodiments, a basic and cost-effective camera device 610 may be economically utilized since camera device 610 is preferably able to periodically download captured content information to a dedicated image hub 110 for transfer to a networked data destination from which the system user may subsequently access and utilize the captured content information.

In step 716, image hub 110 may then establish communications with the docked camera device 110 via input/output interface(s) 348 or other means, and then responsively download the captured image data into image hub 110 using a download manager 312 from application software 212. Also, in step 716, certain embodiments of image hub 110 may preferably utilize a recharger module 124 and a recharge manager 218 to recharge one or more batteries 652 that supply operating power for camera device 610.

In step 720, the system user may preferably disconnect camera device 610 from image hub 110, and begin to capture additional image. Then, in step 726, a temporary buffer memory 646 in camera device 610 preferably fills with image data, and the battery 652 of camera device 610 simultaneously becomes depleted. Finally, in step 728, the system user may reconnect the camera device 610 to image hub 110 to again download image data and recharge battery 652. The FIG. 7 process may then preferably terminate.

The FIG. 7 method steps are discussed in the context of a single camera device 610 that provides a single download of captured information to image hub 110. However, the utilization of image hub 110 to flexibly manage and transfer different types of information from a plurality of different types of peripheral devices is readily contemplated by the present invention, Referring now to FIG. 8, a flowchart of method steps for utilizing an electronic image hub device 110 is shown, in accordance with one embodiment of the present invention. The FIG. 8 example is presented for purposes of illustration, and, in alternate embodiments, the present invention may readily utilize various other steps and sequences than those discussed in conjunction with the FIG. 8 embodiment.

Figure 8:
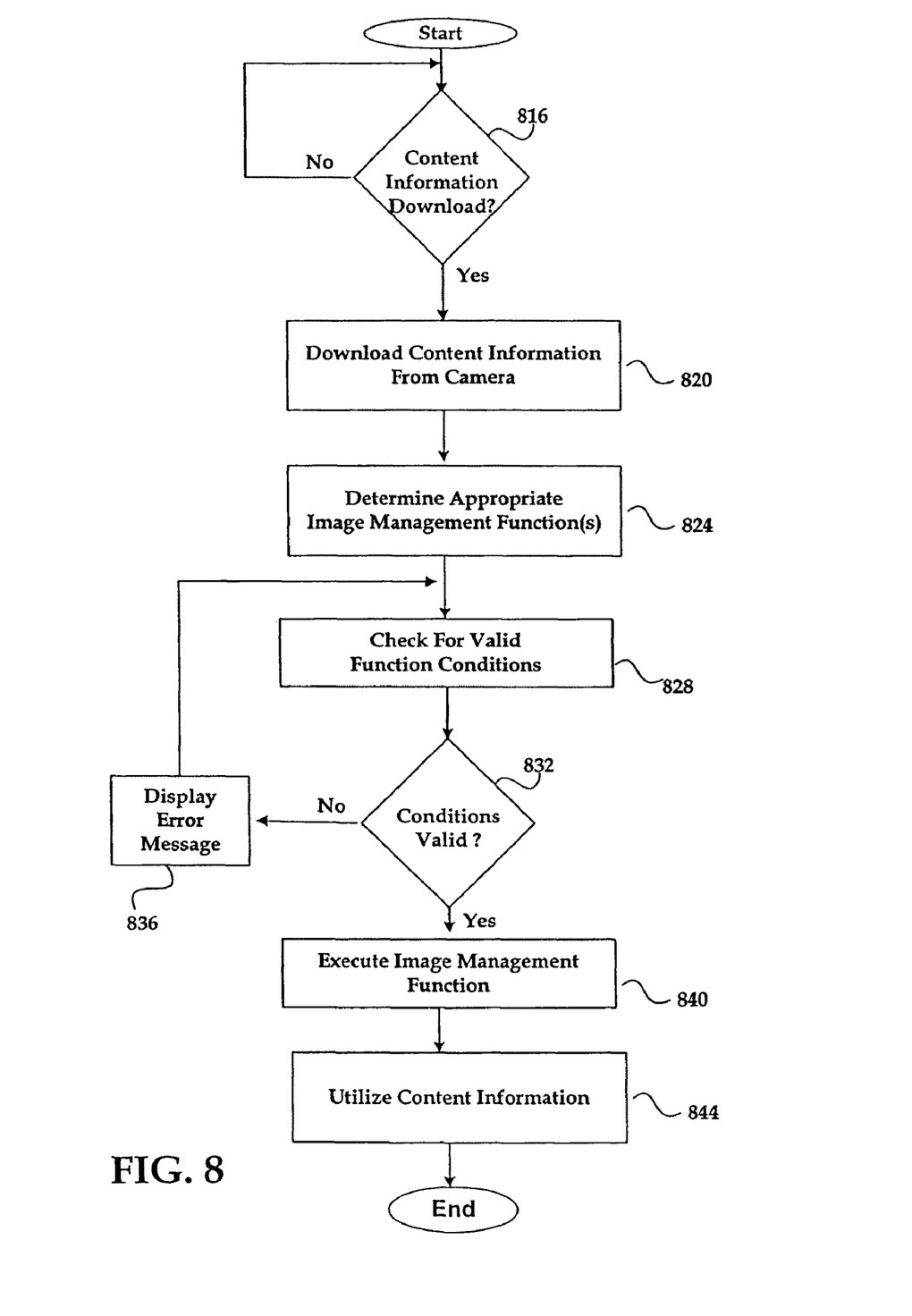
FIG. 8 is a flowchart of method steps for utilizing an electronic image hub device, in accordance with one embodiment of the present invention.

In the FIG. 8 embodiment, initially, in step 816, a download manager 312 in application software 212 may preferably monitor image hub 110 to detect an information download of content information 216 from any appropriate download source, such as a docked camera device 610. Download manager 312 may preferably detect an information download using any appropriate technique(s). For example, connecting a camera device 610 to image hub 110 may generate a download request signal to download manager 312 of image hub 110.

If download manager 312 detects an information download of content information 216, then, in step 820, download manager 312 may preferably transfer or download the particular content information 216 (including captured image data) from the camera device 610. In certain embodiments, download manager 216 may analyze one or more descriptor(s) 412 from the downloaded content information 216 to identify relevant information regarding the content information 216, as discussed above in conjunction with FIG. 4.

In step 824, image hub 110 may preferably determine one or more appropriate image management function(s) to perform with regard to the downloaded content information 216 and docked camera device 610. For example, recharge manager 218 may detect that battery 652 of camera device 610 is currently in a depleted condition, and responsively utilize recharger module 124 to recharge battery 652. In other embodiments, recharger module 124 may automatically recharge battery 652 whenever camera device 610 is connected to image hub 110.

In addition, image hub 110 may perform various data manipulation and/or analysis functions on downloaded content information 216. For example, image hub 110 may preferably route or upload content information 216 to an appropriate or designated data destination by utilizing an upload manager 316. In accordance with the present invention, upload manager 316 may route content information 216 using any effective technique(s). In one embodiment, image hub 110 preferably recognizes and routes content information from a given camera device 610 based upon a camera identification parameter that may be programmed into the camera and detected by image hub 110.

Alternately, a given camera device 610 may tag or mark image data with an image identifier tag that is recognized and utilized by either image hub 110 or the data destination to subsequently provide that image data to the correct system user. In addition, image hub 110 may route content information to one or more data destinations based upon a hub identifier value, or by destination information entered into image hub 110 by the system user or system operator.

In steps 828 and 832, application software 212 preferably checks whether valid conditions currently exist for successful completion of the selected image management function(s) of step 824. If valid conditions do not currently exist for successful completion of the selected image management function, then, in step 836, application software 212 may preferably generate an error message to inform the system user that valid conditions do not currently exist for performing the selected image management function(s). In certain embodiments, the error message may include specific information that identifies the nature of the error and potential remedies to correct the error. The error message function may time-out after a pre-determined time period if invalid conditions persist.

In foregoing step 832, if valid conditions exist for successful completion of the selected image management function (s), then, in step 840, application software 212 may preferably execute the selected image management function(s). Finally, in step 844, a system user may then advantageously, access, manipulate, and utilize the content information 216 from the data destination, in accordance with the present invention.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for managing content information, comprising:
   a peripheral device configured to capture said content information; and
   an image hub configured to transfer said content information from said peripheral device to a data destination from which a system user selectively accesses said content information, said peripheral having a limited transfer capability for transferring said content information only to said image hub, said image hub providing a sole transfer means for downloading said content information from said peripheral device, said peripheral device being implemented as a low-cost digital camera with minimal local memory and limited processing capabilities, said peripheral device being incapable of downloading said content information without said image hub, said image hub providing a sole power source for recharging a power supply in said peripheral device.

* * * * *